(12) United States Patent
Kim (10) Patent No.: US 11,333,951 B2
(45) Date of Patent: May 17, 2022

(54) ACTUATOR FOR CAMERA

(71) Applicant: JAHWA electronics Co., Ltd., Chungcheongbuk-do (KR)

(72) Inventor: Hee Seung Kim, Seoul (KR)

(73) Assignee: JAHWA electronics Co., Ltd., Chungcheongbuk-Do (KR)

(*) Notice: Subject to any disclaimer, the term of this patent is extended or adjusted under 35 U.S.C. 154(b) by 405 days.

(21) Appl. No.: 16/583,829

(22) Filed: Sep. 26, 2019

(65) Prior Publication Data
US 2020/0333686 A1 Oct. 22, 2020

(30) Foreign Application Priority Data

Apr. 22, 2019 (KR) .................. 10-2019-0046666
Jul. 19, 2019 (KR) .................. 10-2019-0087362

(51) Int. Cl.
| | |
|---|---|
| *G03B 5/02* | (2021.01) |
| *G03B 13/36* | (2021.01) |
| *G02B 7/09* | (2021.01) |
| *H02K 41/035* | (2006.01) |
| *G02B 27/64* | (2006.01) |
| *G03B 3/10* | (2021.01) |
| *H02K 7/08* | (2006.01) |
| *G03B 30/00* | (2021.01) |
| *G02B 7/08* | (2021.01) |

(52) U.S. Cl.
CPC .............. *G03B 5/02* (2013.01); *G02B 7/09* (2013.01); *G02B 27/646* (2013.01); *G03B 3/10* (2013.01); *G03B 13/36* (2013.01); *G03B 30/00* (2021.01); *H02K 7/08* (2013.01); *H02K 41/0356* (2013.01); *G02B 7/08* (2013.01); *G03B 2205/0015* (2013.01); *G03B 2205/0053* (2013.01); *G03B 2205/0069* (2013.01)

(58) Field of Classification Search
CPC .... G03B 5/02; G03B 2205/0015; G03B 3/10; G03B 13/36; G03B 30/00; G03B 2205/0053; G03B 2205/0069; G02B 27/646; G02B 7/09; G02B 7/08; H02K 7/08; H02K 41/0356
See application file for complete search history.

(56) References Cited

U.S. PATENT DOCUMENTS

2017/0108705 A1* 4/2017 Yu .................. G02B 13/009

* cited by examiner

*Primary Examiner* — Cara E Rakowski
(74) *Attorney, Agent, or Firm* — The PL Law Group, PLLC

(57) ABSTRACT

An actuator for a camera includes a base having an inner space formed therein, a first OIS carrier accommodated in the base; and a first OIS ball located between an inner side of a side surface of the base and an outer side of a side surface of the first OIS carrier. The first OIS carrier linearly moves in a first direction perpendicular to an optical axis direction along the side surface of the base.

12 Claims, 10 Drawing Sheets

ACTUATOR FOR CAMERA

CROSS-REFERENCE TO RELATED APPLICATION AND CLAIM OF PRIORITY

This application claims priority to Korean Patent Applications Nos. 10-2019-0046666 filed on Apr. 22, 2019 and 10-2019-0087362 filed on Jul. 19, 2019 in the Korean Intellectual Property Office (KIPO), the entire disclosure of which is incorporated by reference herein.

TECHNICAL FIELD

The present disclosure relates to an actuator for a camera and a camera module including the actuator, and more particularly, to an actuator for a camera, which further enhance the space utilization by improving a structure for supporting linear movement of a carrier.

BACKGROUND ART

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

An autofocus (AF) function (or, an automatically focusing function) means a function of a focal length to a subject by linearly moving a carrier having a lens in an optical axis direction to generate a clear image at an image sensor (CMOS, CCD, etc.) located at the rear of the lens.

In addition, an optical image stabilization (OIS) function means a function of improving the sharpness of an image by adaptively moving the carrier having a lens in a direction to compensate for the shaking when the lens is shaken due to trembling.

One typical method for implementing the AF or OIS function is to install a magnet (a coil) on a mover (a carrier) and install a coil (a magnet) on a stator (a housing, or another type of carrier, or the like), and then generate an electromagnetic force between the coil and the magnet so that the mover moves in the optical axis direction or in a direction perpendicular to the optical axis.

Meanwhile, there is a device that connects the carrier to a wire in order to physically support the carrier and restore the position of the carrier. However, if the device is used, the physical properties of the wire may be easily deformed due to the internal and external environment, thereby easily deteriorating the driving precision. In particular, as the weight and size of the lens increase due to high specification of the lens, driving performance may be further deteriorated.

In order to solve the problem of the wire type, recently, a ball is interposed between the mover and the stator to maintain a proper separation distance between the mover and the stator, and the carrier moves more flexibly and accurately by means of a minimized frictional force through the rotational motion of the ball and the point contact with the ball.

In a device or actuator in which the AF and OIS functions are integrated, an AF carrier must move in the optical axis direction and an OIS carrier must move in a direction perpendicular to the optical axis, resulting in a complex physical structure in which the AF and OIS carriers are stacked on each other.

In a conventional device, the AF carrier is generally provided in a housing, which serves as a stator, so that the AF carrier moves up and down in the optical axis direction (Z-axis direction) inside the housing. Also, a first carrier moving in the X-axis direction perpendicular to the optical axis and a second carrier moving in the Y-axis direction (a direction perpendicular to both the optical axis and the X axis) are included inside the AF carrier.

In addition, in this device, a ball is disposed between an upper surface of the AF carrier (based on the Z-axis direction) and a lower surface of the first carrier (based on the Z-axis direction) and between an upper surface of the first carrier and a surfaces of the second carrier, respectively, to guide the movement of each carrier.

Thus, in the conventional device, a plurality of carriers are stacked up and down based on the optical axis direction, and the balls are respectively disposed between the carriers so that the height thereof is significantly increased based on the optical axis direction.

Since the actuator for a camera is installed to stand on a main board of a portable terminal such as a smartphone, the height of the actuator means that the thickness of the portable terminal is increased. Thus, the conventional device cannot meet the trend of slimming the portable terminal, and its space utilization is extremely low.

In addition, in the conventional device, in order to meet the thickness specification or the like of the portable terminal, the height or size of a structure, components and the like, which are directly related to the driving performance, must be reduced. Thus, the conventional device has a problem in that the driving performance is degraded.

SUMMARY

The present disclosure is designed to solve the problems of the related art, and therefore the present disclosure is directed to providing an actuator for a camera, which may further enhance the driving performance and the thickness utilization of the actuator by improving a structure for physically supporting and guiding carriers in a way fundamentally different from the conventional technique.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an actuator for a camera, comprising: a base having an inner space formed therein; a first OIS carrier accommodated in the base to move in a first direction perpendicular to an optical axis direction; and a first OIS ball located between an inner side of a side surface of the base and an outer side of a side surface of the first OIS carrier, wherein the first OIS carrier linearly moves in the first direction along the side surface of the base.

Preferably, the actuator according to the present disclosure may further comprise a first OIS magnet provided to the first OIS carrier; and a first OIS coil configured to give a driving force to the first OIS magnet.

Also, the actuator according to the present disclosure may further comprise a first guide line formed at the inner side of the side surface of the base to extend in the first direction; and a first groove line formed at the outer side of the side surface of the first OIS carrier to extend in the first direction, wherein the first OIS ball may be located between the first guide line and the first groove line.

Moreover, the actuator according to the present disclosure may further comprise an AF carrier mounted on the first OIS carrier and having an AF magnet; an AF coil configured to give a driving force to the AF magnet; and an AF ball located between the inner side of the side surface of the first OIS carrier and an outer side of a side surface of the AF carrier, wherein the AF carrier may linearly move in the optical axis direction relative to the first OIS carrier.

Also, the actuator according to the present disclosure may further comprise a second guide line formed at the inner side of the side surface of the first OIS carrier to extend in the optical axis direction; and a second groove line formed at the outer side of the side surface of the AF carrier to extend in the optical axis direction, wherein the AF ball may be located between the second guide line and the second groove line.

Preferably, the actuator according to the present disclosure may further comprise a second OIS carrier mounted on the AF carrier and having a second OIS magnet; a second OIS coil configured to give a driving force to the second OIS magnet; and a second OIS ball located between a bottom surface of the AF carrier and a lower surface of the second OIS carrier, wherein the second OIS carrier may linearly move in a second direction perpendicular to both the optical axis direction and the first direction relative to the AF carrier.

Also, depending on an embodiment, the actuator according to the present disclosure may further comprise a first OIS magnet provided to a surface of the second OIS carrier, which is perpendicular to the second OIS magnet, or to the first OIS carrier; and a first OIS coil configured to give a driving force to the first OIS magnet.

Moreover, the actuator according to the present disclosure may further comprise a third guide line formed at the bottom surface of the AF carrier to extend in the second direction; and a third groove line formed at the lower surface of the second OIS carrier to extend in the second direction, wherein the second OIS ball may be located between the third guide line and the third groove line.

More preferably, the AF ball according to the present disclosure may be in contact with an inner side of a support surface that is a side surface of the first OIS carrier in contact with the first OIS ball at an outer side thereof, and the support surface may have an opening formed at a center portion thereof so that the AF magnet included in the AF carrier is exposed to the outside.

Also, the base according to the present disclosure may include a main yoke made of a metal material to generate an attractive force to the AF magnet, and an adhering force between the AF carrier and the first OIS carrier between which the AF ball is interposed and an adhering force between the first OIS carrier and the base between which the first OIS ball is interposed may be simultaneously implemented due to the attractive force between the AF magnet and the main yoke.

In another aspect of the present disclosure, there is also provided an actuator for a camera, comprising: a base having an inner space formed therein; a first OIS carrier accommodated in the base; a second OIS carrier accommodated in the first OIS carrier; an AF carrier located between the first OIS carrier and the second OIS carrier; a first OIS ball located on a first surface between the first OIS carrier and the base, which is parallel to an optical axis; and a second OIS ball located on a second surface between the second OIS carrier and the AF carrier, which is perpendicular to the optical axis and the first surface, wherein the first OIS carrier linearly moves in a first direction perpendicular to the optical axis together with the AF carrier and the second OIS carrier on the first surface.

Also, depending on an embodiment, the actuator according to the present disclosure may further comprise a first OIS magnet provided to the AF carrier in a direction perpendicular to the AF magnet; and a first OIS coil configured to give a driving force to the first OIS magnet.

According to a preferred embodiment of the present disclosure, since the conventional structure for moving the carrier serving as a mover relative to the bottom surface of the stator is changed into a structure for moving relative to the side surface of the stator, it is possible to more effectively enhance the thickness and space utilization of the actuator.

In addition, according to the present disclosure, since the linear movements in the Z-axis direction, the X-axis direction and the Y-axis direction are made in different areas, the movements in individual directions may be implemented more independently, and thus it is possible to further improve the driving performance and the precision of linear movement in each direction according to the AF and OIS functions.

Moreover, according to another embodiment of the present disclosure, since the attracting structures for maintaining a contact between the AF carrier and the AF ball and a contact between the OIS carrier and the OIS ball at all times may be simultaneously implemented just using an AF magnet and a yoke, it is possible to further simplify the device configuration.

In addition, according to another embodiment of the present disclosure, since a plurality of driving magnets may be provided to a specific moving object by effectively using a physical structure in which the balls moving in various directions are guided perpendicular to each other, it is possible to solve the structural complexity and the inefficient assembling process of the conventional device, in which a driving magnet must be provided to all moving objects, and it is also possible to secure the space more easily, thereby improving the efficiency of the device design.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
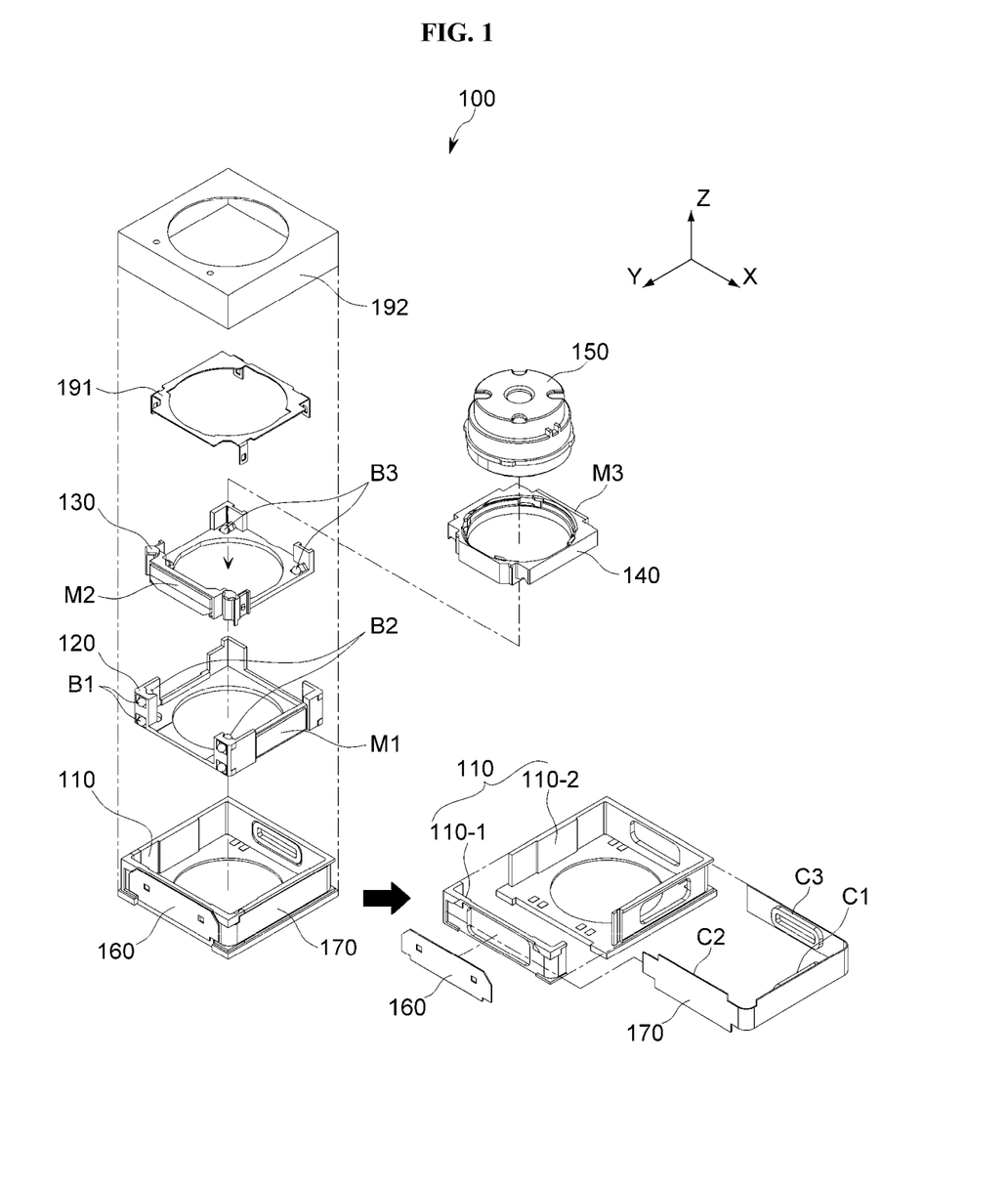
FIG. 1 is an exploded view showing an actuator for a camera according to a preferred embodiment of the present disclosure.

FIG. 1 is an exploded view showing an actuator 100 for a camera (hereinafter referred to as an actuator) according to the present disclosure. Hereinafter, the overall configuration of the present disclosure will be described first with reference to FIG. 1, and an embodiment of the present disclosure for implementing AF and OIS functions will be described later.

The actuator 100 of the present disclosure as shown in FIG. 1 is an embodiment in which the AF and OIS functions are implemented together, but the actuator 100 of the present disclosure may also be implemented as an actuator only for the OIS function depending on an embodiment.

As shown in FIG. 1, the actuator 100 of the present disclosure may include a base 110, a first OIS carrier 120, an AF carrier 130, a second OIS carrier 140, a lens assembly 150, a main yoke 160, a stopper 191, and a case 192.

The Z-axis direction shown in FIG. 1 is an optical axis direction in which light enters the lens assembly 150, and this corresponds to a direction in which the AF carrier 130, explained later, moves forward and backward.

If the AF carrier 130 moves forward and backward in the optical axis direction, the focal length between the lens assembly 150 and a photographing device (not shown) such as a charge-coupled device (CCD) and a complementary metal-oxide semiconductor (CMOS), which is provided at the rear of the actuator 100, is adjusted, thereby implementing the AF function.

Meanwhile, two directions, namely the X-axis direction and the Y-axis direction, perpendicular to the optical axis direction (Z-axis direction) mean directions in which the lens assembly 150 moves by the OIS operation to compensate for shaking caused by trembling. In the following description, the X-axis direction is referred to as a first direction and the Y-axis direction is referred to as a second direction. However, this is only one example according to a relative point of view, and either of the X-axis direction and the Y-axis direction may be the first direction, and the other direction may be the second direction.

As shown in FIG. 1, the actuator 100 of the present disclosure has a structure in which the first OIS carrier 120, the AF carrier 130 and the second OIS carrier 140 are sequentially provided based on the base 110 functioning as a kind of housing.

The base 110 of the present disclosure corresponds to a basic frame structure of the actuator 100 according to the present disclosure. In order to increase the efficiency of the assembling process, as illustrated in FIG. 1, the base 110 may be dualized into a main base 110-2 and a guide base 110-1, or may be integrally formed depending on an embodiment.

The first OIS carrier 120 of the present disclosure moves in the first direction (X-axis direction) in the inner space of base 110 when the OIS is driven. In this regard, the first OIS carrier 120 corresponds to a mover, and in a corresponding sense, the base 110 corresponds to a stator.

If a position sensor (not shown) such as a hall sensor transmits an electric signal corresponding to a moving direction caused by trembling and its magnitude to an operation driver (not shown), the operation driver controls the power corresponding to the magnitude and direction to be applied to a first OIS coil C1.

If the power is applied to the first OIS coil C1, the first OIS coil C1 generates an electromagnetic force to a first OIS magnet M1 installed at the first OIS carrier 120, and the first OIS carrier 120 moves in the first direction due to the electromagnetic force. The detection of the hall sensor and the processing of the driver may be performed cyclically through feedback control.

Depending on an embodiment, the first OIS magnet M1 of the present disclosure may not be installed at the first OIS carrier 120 unlike the embodiment illustrated in the figures but be installed at a second OIS carrier 140 on which the lens assembly 150 is mounted as explained later with reference to FIG. 10.

In this case, a second OIS magnet M3 and the first OIS magnet M1 for the OIS operation in the second direction may be mounted together to the second OIS carrier 140 in directions perpendicular to each other.

As shown in FIG. 1 and the like, the actuator 100 according to an embodiment of the present disclosure is configured such that the AF carrier 130 and the second OIS carrier 140 are mounted inside the first OIS carrier 120. Thus, if the first OIS carrier 120 moves in the first direction, both the AF carrier 130 and the second OIS carrier 140 move in the first direction.

Since the lens assembly 150 is mounted on the second OIS carrier 140, if the first OIS carrier 120 moves in the first direction, the lens assembly 150 also moves in the first direction to compensate for trembling in the first direction.

As shown in FIG. 1, the AF carrier 130 of the present disclosure is provided to the first OIS carrier 120 of the present disclosure to move in the optical axis direction (Z-axis direction) relative to the first OIS carrier 120. In this regard, if the AF carrier 130 is a mover, the first OIS carrier 120 corresponds to a stator in the corresponding point of view.

That is, the first OIS carrier 120 of the present disclosure corresponds to a mover in relation to the first direction movement for the OIS operation but corresponds to a stator in relation to the AF operation.

If the power of appropriate magnitude and direction is applied to an AF coil C2, the AF coil C2 generates an electromagnetic force to an AF magnet M2 installed at the AF carrier 130, and the AF carrier 130 moves in the optical axis direction due to the electromagnetic force.

Since the AF carrier 130 includes the second OIS carrier 140 and the lens assembly 150 is mounted on the second OIS carrier 140, if the AF carrier 130 moves in the optical axis direction, the second OIS carrier 140 also moves in the optical axis direction and the lens assembly 150 also moves in the optical axis direction to adjust the focal length to the photographing device.

As shown in FIG. 1, the second OIS carrier 140 of the present disclosure is provided to the AF carrier 130 of the present disclosure and corresponds to a mover that moves in the second direction (Y-axis direction) relative to the AF carrier 130, and the AF carrier 130 of the present disclosure serves as a stator relative to the movement of the OIS carrier 140.

In this regard, the AF carrier 130 of the present disclosure corresponds to a mover in relation to the AF operation but relatively corresponds to a stator in relation to the OIS operation in the second direction.

If the power of appropriate magnitude and direction is applied to a second OIS coil C3, the second OIS coil C3 generates an electromagnetic force to the second OIS magnet M3 installed at the second OIS carrier 140, and the second OIS carrier 140 moves in the second direction (Y-axis direction) due to the electromagnetic force. The trembling in the second direction is compensated by the above movement of the second OIS carrier 140.

The feedback control of the hall sensor and the operation driver as described above may also be applied to the movement of the second OIS carrier 140.

The stopper 191 of the present disclosure is coupled to the AF carrier 130 at a location above the AF carrier 130 after the second OIS carrier 140 is mounted on the AF carrier 130. In this configuration, the linear movement of the second OIS carrier 140 in the second direction may be induced more smoothly, and also the second OIS carrier 140 may be prevented from being lifted or separated in the optical axis direction.

Figure 2:
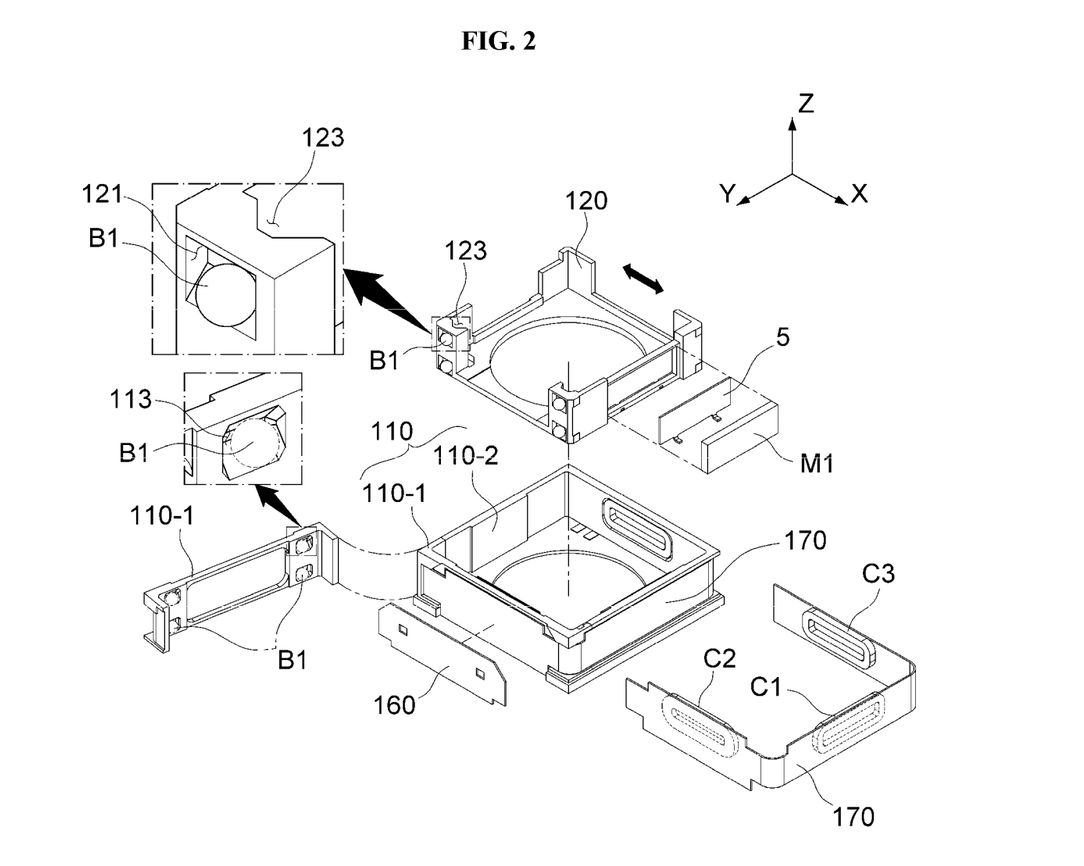
FIG. 2 is a diagram showing a base and a first OIS carrier according to a preferred embodiment of the present disclosure.
Figure 3:
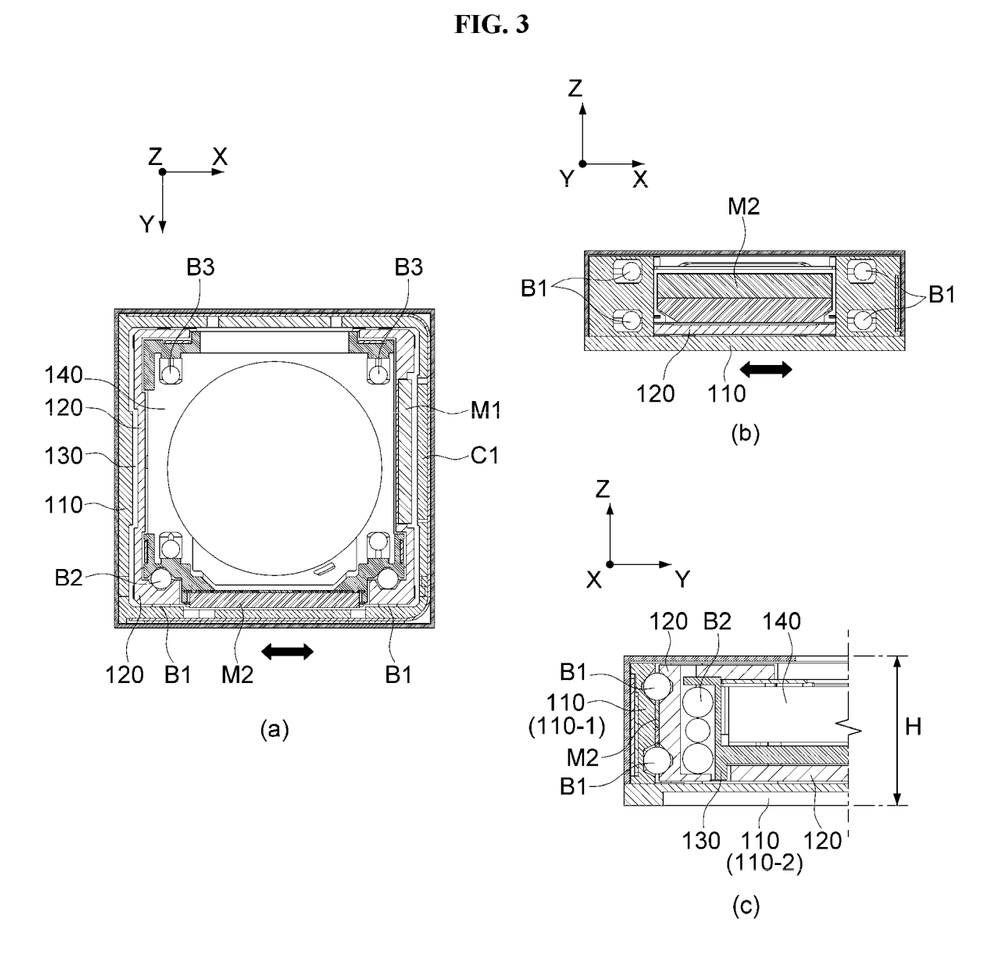
FIG. 3 is a diagram for illustrating a movement relationship of the first OIS carrier according to the present disclosure.

FIG. 2 is a diagram showing the base 110 and the first OIS carrier 120 according to a preferred embodiment of the present disclosure, and FIG. 3 is a diagram for illustrating a movement relationship of the first OIS carrier 120.

Hereinafter, the detailed configuration of the first OIS carrier 120 of the present disclosure moving in the first direction according to the OIS operation and related configuration will be described with reference to FIGS. 2 and 3.

As described above, the first OIS carrier 120 of the present disclosure corresponds to a mover moving in the first direction (X-axis direction) perpendicular to the optical axis.

As shown in FIG. 2, the first OIS magnet M1 is provided to one side surface of the first OIS carrier 120 of the present disclosure. Also, a back yoke 5 may be additionally provided to the rear surface of the first OIS magnet M1 to prevent flux leakage and concentrate the flux. The back yoke may also be additionally provided to other driving magnets M2, M3, explained later.

A first OIS coil C1 for giving a driving force to the first OIS magnet M1 is provided to the base 110 to face the first OIS magnet M1. The first OIS coil C1 may be provided on a circuit board 170 made of FPCB or the like together with the other coils C2, C3.

A first OIS ball B1 for effectively guiding the movement of the first OIS carrier 120 in the first direction is disposed between the base 110 and the first OIS carrier 120.

In the conventional device, such a ball means is typically disposed at a bottom surface or a lower surface between the mover and the stator. However, in the present disclosure, fundamentally different from the conventional device, the first OIS ball B1 is located between an inner side of one side surface of the base 110 and an outer side of one side surface of the first OIS carrier 120 as shown in FIG. 2.

With this structure and arrangement of the first OIS ball B1, the first OIS carrier 120 of the present disclosure linearly moves in the first direction perpendicular to the optical axis along the side surface of the base 110. In other words, the first OIS ball B1 of the present disclosure is located on a first surface, which is parallel to the optical axis, among the facing surfaces between the first OIS carrier 120 and the base 110.

A first guide line 113 extending in the first direction may be formed at the inner side of the side surface (the first surface) of the base 110. Also, a first groove line 121 extending in the first direction may be formed at the outer side the side surface of the first OIS carrier 120, which faces the first surface.

In this case, the first OIS ball B1 is disposed between the first guide line 113 and the first groove line 121. Through this configuration, it is possible not only to effectively prevent the first OIS ball B1 from being deviated outward but also to more precisely move the first OIS carrier 120 linearly in the first direction due to the physical guide of the first guide line 113 and the first groove line 121.

If the base 110 is dualized into the main base 110-2 and the guide base 110-1, the first guide line 113 may be formed at the inner side of the guide base 110-2.

As described above, the first OIS carrier 120 according to the present disclosure moves along the side surface of the base 110 by means of the physical guiding of the base 110 along the side surface, and the first OIS ball B1 is disposed between the inner side of one side surface of the base 110 and the outer side of one side surface of the first OIS carrier 120.

Thus, the actuator 100 according to the present disclosure does not need to dispose a physical structure for guiding the movement of the ball and the carrier in the first direction at the lower surface or the bottom surface thereof, thereby dramatically reducing the thickness of the actuator (based on the optical axis direction).

As the screen display means of a portable terminal becomes wider recently, the width of the main substrate is also sufficiently increased. In the present disclosure, since the size is increased only in the width direction, which is the horizontal direction based on the optical axis, it is possible to implement a structure that more closely meets the tendency of the portable terminal.

As shown in (a) and (b) of FIG. 3, the first OIS carrier 120 of the present disclosure linearly moves in the first direction (X-axis direction) relative to the base 110, and based on (c) of FIG. 3, the first OIS carrier 120 linearly moves in a direction of entering or exiting the figure.

In addition, since the first OIS ball B1 for guiding the movement of the first OIS carrier 120 is disposed between the base 110 and the side surface of the first OIS carrier 120 and is not disposed at the lower surface or the bottom surface of the base 110/110-1 and the first OIS carrier 120, the height of the entire actuator 100 in the optical axis direction H (see (c) of FIG. 3) may be sufficiently lowered.

Figure 4:
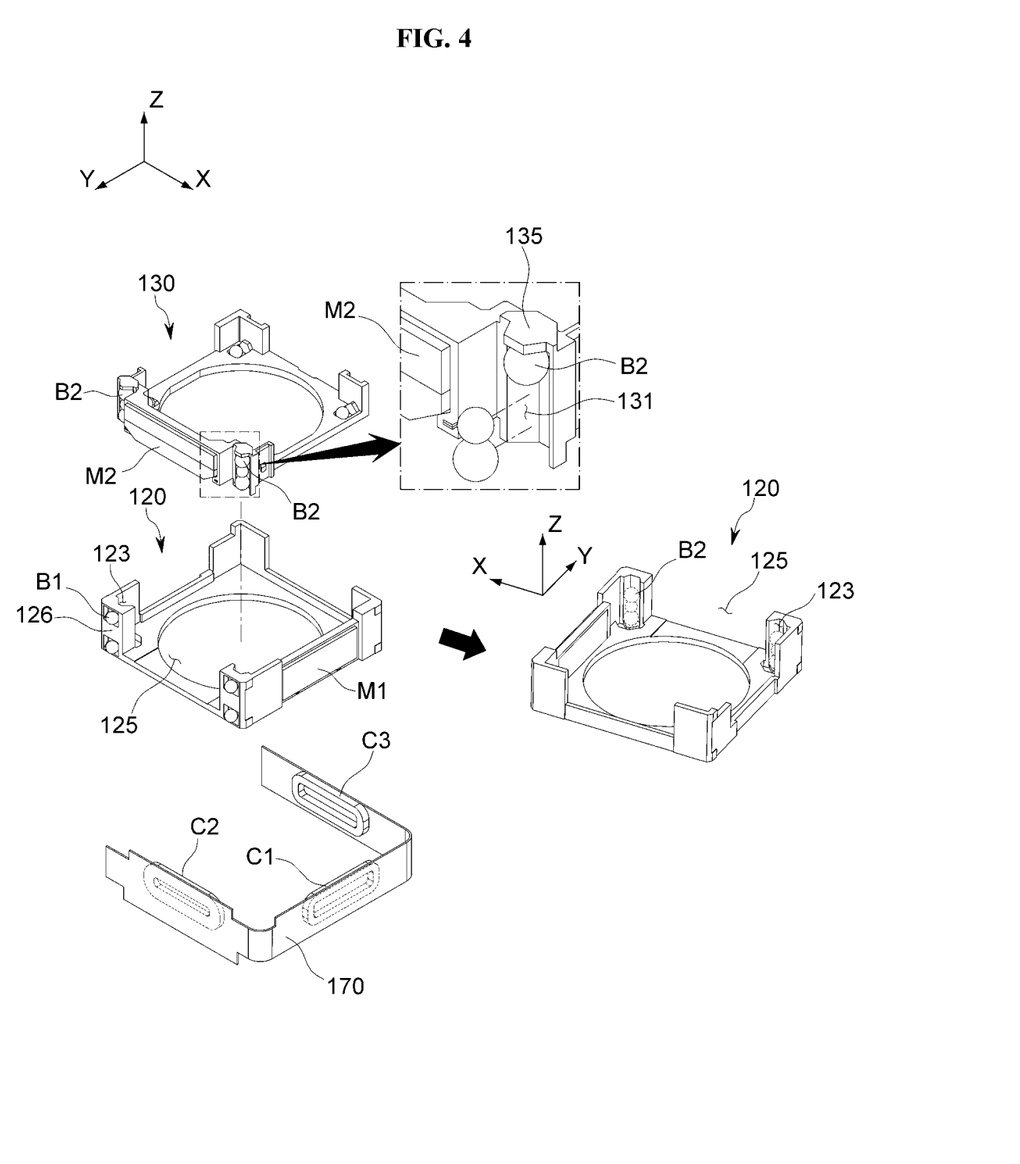
FIG. 4 is a diagram showing a first OIS carrier and an AF carrier according to a preferred embodiment of the present disclosure.
Figure 5:
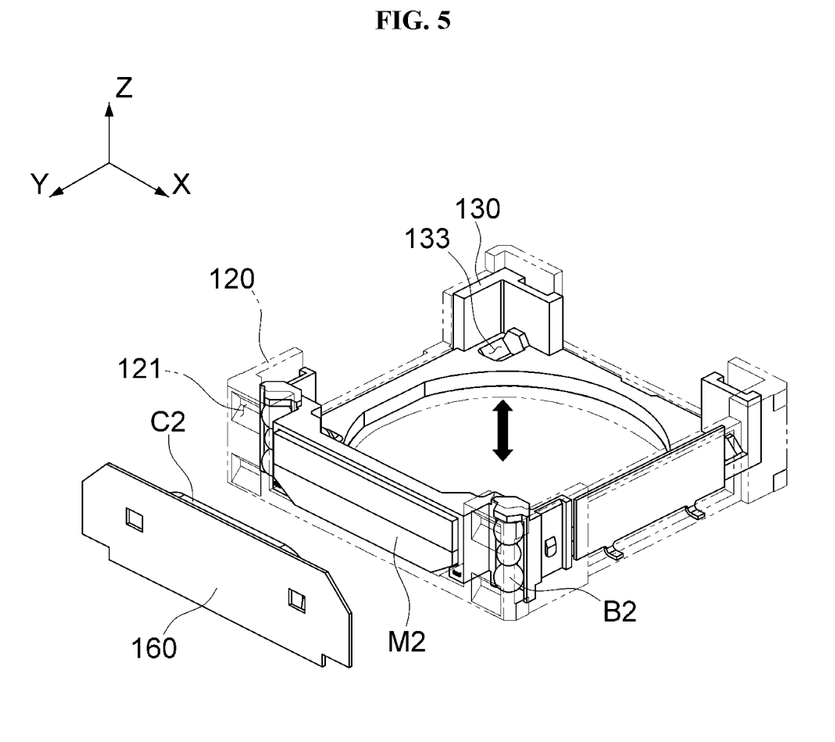
FIG. 5 is a diagram for illustrating a movement relationship of the AF carrier according to the present disclosure.
Figure 6:
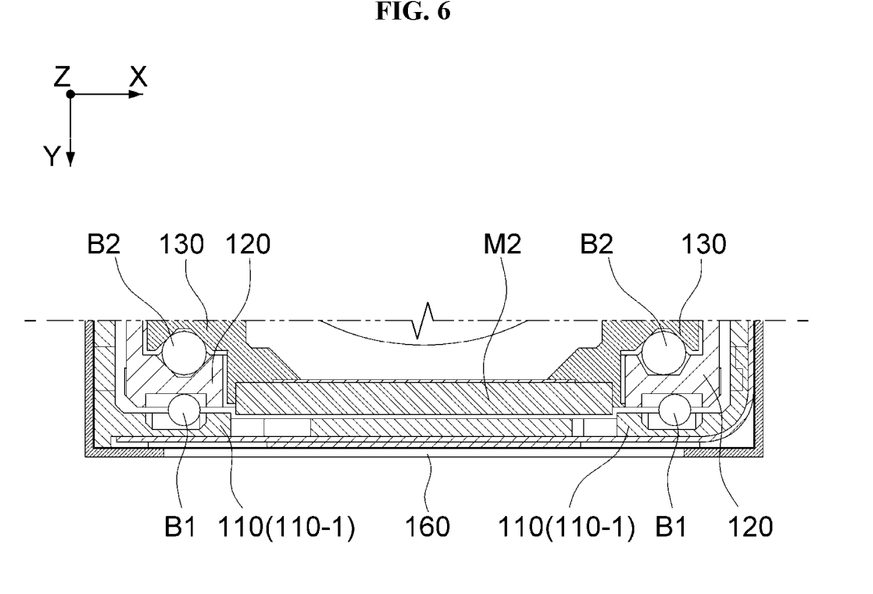
FIG. 6 is a diagram for illustrating an attractive force applied between the AF magnet and the main yoke.

FIG. 4 is a diagram showing the first OIS carrier 120 and the AF carrier 130 according to a preferred embodiment of the present disclosure, FIG. 5 is a diagram for illustrating a movement relationship of the AF carrier 130, and FIG. 6 is a diagram for illustrating an attractive force applied between the AF magnet M2 and the main yoke 160.

Hereinafter, the detailed configuration of the AF carrier 130 of the present disclosure, which moves in the optical axis direction due to AF operation, and related configuration will be described with reference to FIG. 4 or the like.

The AF carrier 130 of the present disclosure is provided to the first OIS carrier 120 and corresponds to a mover linearly moving in the optical axis direction relative to the first OIS carrier 120 as shown in FIG. 4 or the like.

As illustrated in FIG. 4, the AF magnet M2 is provided at one side of the AF carrier 130, and the AF coil C2 is provided to the base 110 at a side facing the AF magnet M2 to give a driving force to the AF magnet M2.

Referring to FIG. 5, if the power of appropriate magnitude and direction is applied to the AF coil C2 as described above, the electromagnetic force generated at the AF coil C2 is transmitted to the AF magnet M2, so that the AF carrier 130 including the AF magnet M2 linearly moves in the optical axis direction.

An AF ball B2 of the present disclosure includes at least one ball, it is preferable that a plurality of balls are arranged side by side based on the optical axis direction as shown in the figure. The AF ball B2 is disposed between the AF carrier 130 and the first OIS carrier 120, and specifically, the AF ball B2 is located between the inner side of the side surface of the first OIS carrier 120 and the outer side of the side surface of the AF carrier 130.

A second guide line 123 may be formed at the inner side of the side surface of the first OIS carrier 120 to extend in the optical axis direction. Also, a second groove line 131 may be formed at the outer side of the side surface of the AF carrier 130 to extend in the optical axis direction.

In this case, the AF ball B2 is disposed between the second guide line 123 and the second groove line 131, and a protrusion 135 may be provided at the end of the second groove line 131 to prevent the AF ball B2 from being deviated outward.

An opening 125 is preferably formed at a center portion of the support surface 126, at which the first groove line 121 is formed, among the side surfaces of the first OIS carrier 120 of the present disclosure so that the AF magnet M2 of the AF carrier 130 is exposed to the outside.

In addition, the second guide line 123 is preferably formed at the inner side of the support surface 126 so that the first groove line 121 and the second guide line 123 are formed together at the outer or inner side of the same support surface 126.

Further, the first groove line 121 and the second guide line 123 are preferably formed to be symmetrical in the left and right direction relative to the opening 125 of the support surface 126.

In this configuration, the AF ball B2 is in contact with the inner side of the support surface 126, which is in contact with the outer side of the first OIS ball B1 among the side surfaces of the first OIS carrier 120. That is, based on the support surface 126 of the first OIS carrier 120, the first OIS ball B1 is located at the outer side and the AF ball B2 is located at the inner side.

Meanwhile, as shown in FIGS. 1, 2 and 5, the main yoke 160 is provided at the base 110 of the present disclosure. The main yoke 160 is made of a metal material with a magnetic property and generates an attractive force to the AF magnet M2, explained above.

As described above, based on the first OIS carrier 120 (specifically, the support surface 126), the first OIS ball B1 is located at the outer side and the AF ball B2 is located at the inner side, and the AF magnet M2 and the main yoke 160 generating an attractive force are provided to the AF carrier 130 and the base 110, respectively.

Thus, as shown in FIG. 6, the attractive force between the main yoke 160 and the AF magnet M2 may keep the AF carrier 130 and the first OIS carrier 120 in contact with the AF ball B2 but simultaneously maintain the first OIS Carrier 120 and the base 110 in contact with the first OIS ball B1 continuously.

That is, in the actuator 100 according to the present disclosure, the adhering force between the AF carrier 130 and the first OIS carrier 120 between which the AF ball B2 is interposed and the adhering force between the first OIS carrier 120 and the base 110/110-1 between which the first OIS ball B1 is interposed may be simultaneously implemented by means of the attractive force between the AF magnet M2 and the main yoke 160.

Figure 7:
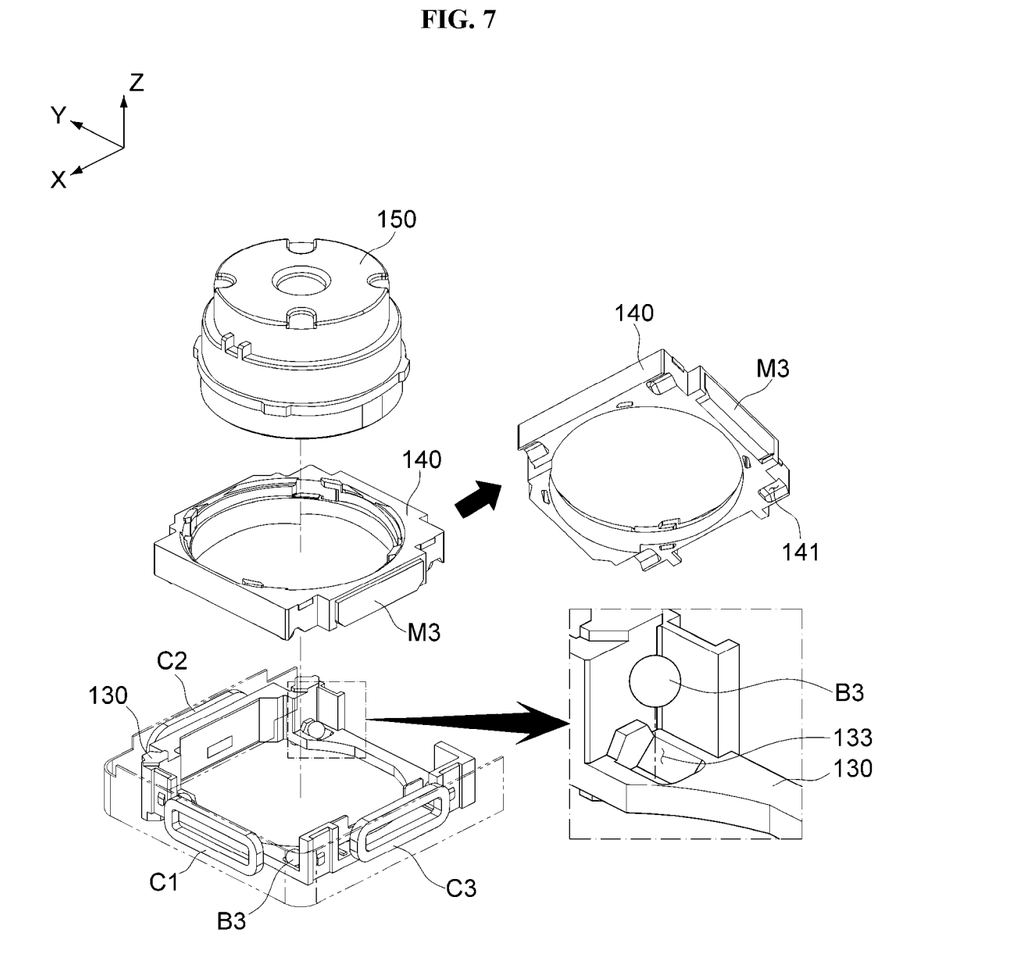
FIG. 7 is a diagram showing an AF carrier and a second OIS carrier according to a preferred embodiment of the present disclosure.
Figure 8:
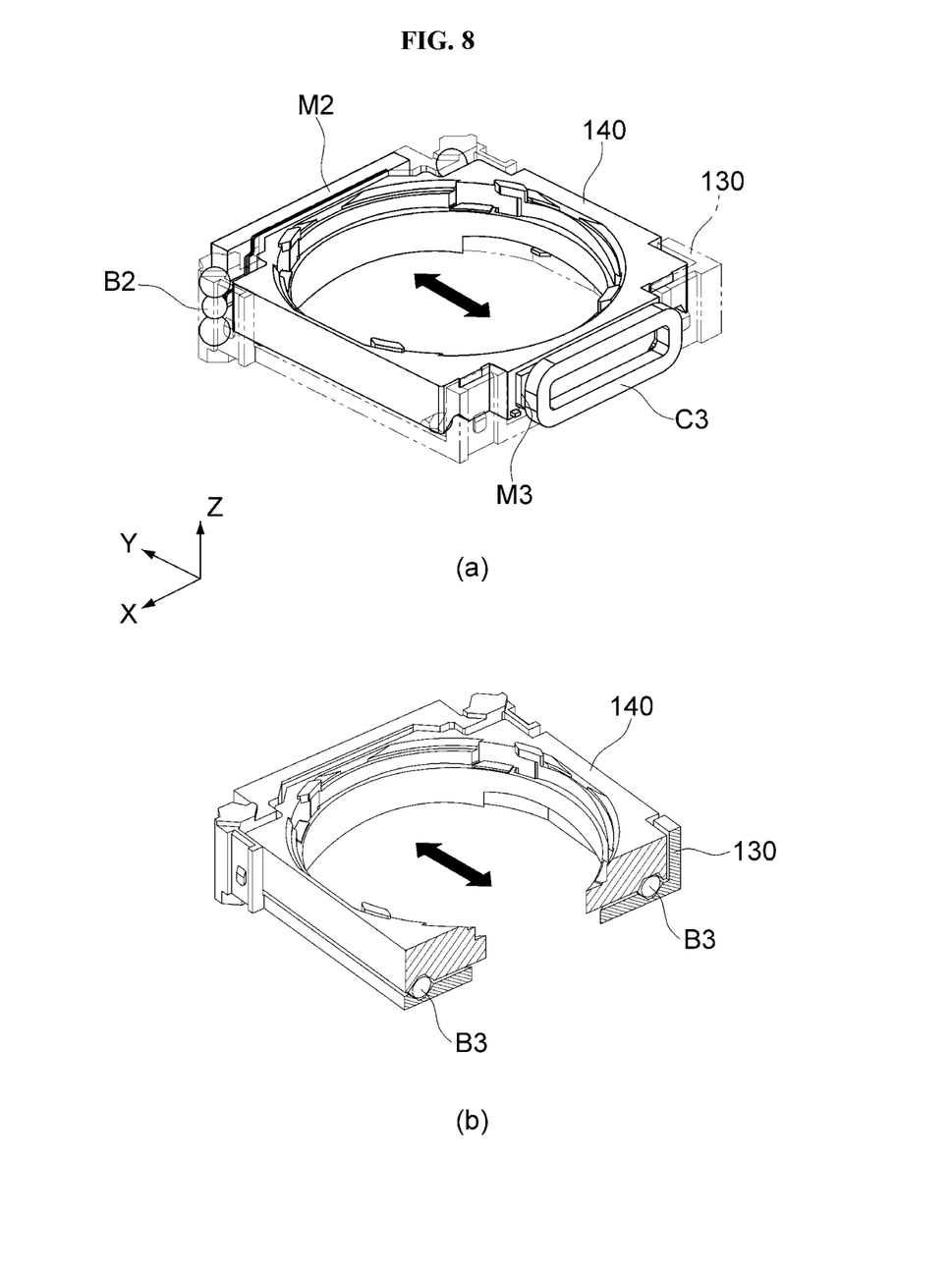
FIG. 8 is a diagram for illustrating a movement relationship of the second OIS carrier according to the present disclosure.

FIG. 7 is a diagram showing the AF carrier 130 and the second OIS carrier 140 according to a preferred embodiment of the present disclosure, and FIG. 8 is a diagram for illustrating a movement relationship of the second OIS carrier 140 according to the present disclosure.

Hereinafter, the detailed configuration of the second OIS carrier 140 of the present disclosure, which moves in the second direction according to the OIS operation, and related configuration will be described with reference to FIG. 7 or the like.

As briefly described above with reference to FIG. 1 or the like, the second OIS carrier 140 of the present disclosure is mounted on the AF carrier 130 and includes the second OIS magnet M3. As described above, the second OIS coil C3 is provided in a direction facing the second OIS magnet M3.

As shown in (a) and (b) of FIG. 8, if an electromagnetic force is generated by applying power of appropriate magnitude and direction to the second OIS coil C3, the second OIS carrier 140 including the second OIS magnet M3 moves linearly in the second direction perpendicular to both the optical axis and the first direction relative to the AF carrier 130 by using the electromagnetic force as a driving force.

A second OIS ball B3 is preferably located between the second OIS carrier 140 and the AF carrier 130 so that the linear movement of the second OIS carrier 140 is performed more smoothly. That is, the second OIS ball B3 of the present disclosure is provided at the second surface that is a plane perpendicular to both the first surface (between the base 110 and the first OIS carrier 120) where the first OIS ball B1 is provided and the optical axis.

Specifically, a third guide line 133 extending in the second direction is provided at the bottom surface (the second surface) of the AF carrier 130, and a third groove line 141 is formed at the lower surface of the second OIS carrier 140 at a location corresponding thereto. In this case, the second OIS ball B3 is located between the third guide line 133 and the third groove line 141.

Figure 9:
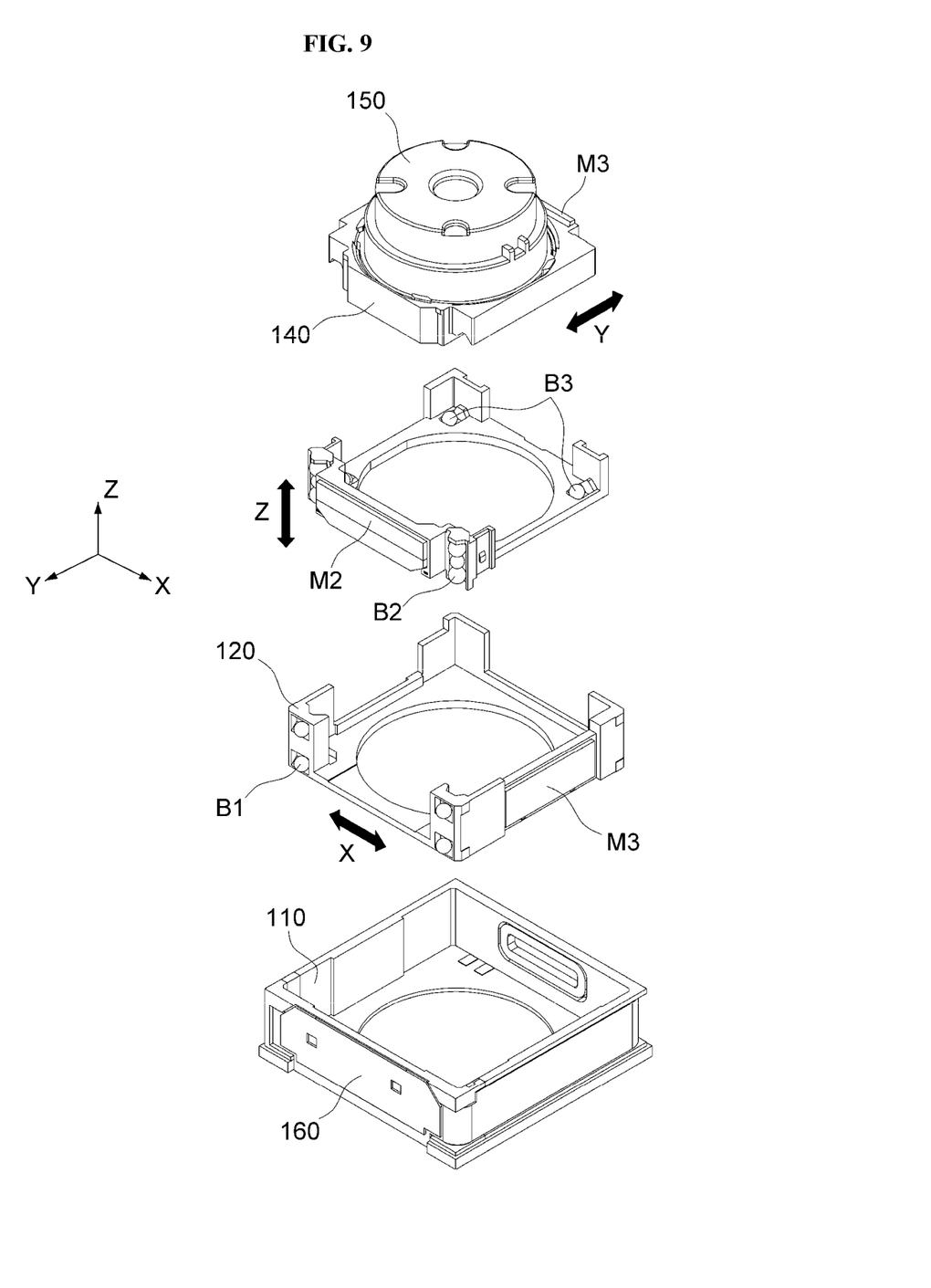
FIG. 9 is a diagram for illustrating a movement relationship in each direction by the AF and OIS functions.

FIG. 9 is a diagram for illustrating a movement relationship in each direction by the AF and OIS functions. As shown in FIG. 9, the first OIS carrier 120 of the present disclosure moves in the first direction (X-axis direction) relative to the base 110 when a driving force is applied to the first OIS magnet M1.

Since the first OIS ball B1 of the present disclosure is disposed between the inner side of the side surface of the base 110 and the outer side of the side surface of the first OIS carrier 120, different from the conventional technique, through this configuration, the first OIS carrier 120 of the present disclosure linearly moves along the side surface of the base 110.

If the first OIS carrier 120 moves in the first direction as above, the AF carrier 130 and the second OIS carrier 140 sequentially mounted on the first OIS carrier 120 also move in the first direction, so that the lens assembly 150 mounted on the second OIS carrier 140 moves in the first direction (X-axis direction) to compensate for trembling in the first direction.

If a driving force is applied to the AF magnet M2 provided in the AF carrier 130, the AF carrier 130 of the present disclosure is guided by the AF ball B2 located between the AF carrier 130 and the first OIS carrier 120 to linearly move in the optical axis direction (Z-axis direction).

If the AF carrier 130 moves in the optical axis direction, the second OIS carrier 140 mounted on the AF carrier 130 also moves in the optical axis direction as described. Thus, the lens assembly 150 mounted on the second OIS carrier 140 moves in the optical axis direction, thereby implementing the AF function.

The second OIS carrier 140 of the present disclosure is mounted on the AF carrier 130, and if a driving force is provided to the AF magnet M2, the second OIS carrier 140 is guided by the second OIS ball B3 located between the second OIS carrier 140 and the AF carrier 130 to linearly move in the second direction (X-axis direction).

The movement of the first OIS carrier 120 in the first direction, the movement of the AF carrier 130 in the optical axis direction and the movement of the second OIS carrier 140 in the second direction may be driven independently by separate processing and separate physical structures, so that the movement in each direction is achieved separately. Also, the movements in a plurality of mutually combined directions (XY, XZ, YZ, XYZ, etc.) may be performed simultaneously.

As shown in FIG. 9, the AF ball B2 is located between the first OIS carrier 120 and the AF carrier 130 and moves (rolls) in the optical axis direction (Z-axis direction) to guide the movement of the AF carrier 130 in the optical axis direction.

Also, the first OIS ball B1 is disposed at the first surface, similar to the AF ball B2, and linearly moves (rolls) in the first direction (X-axis direction) perpendicular to the linearly moving (rolling) direction of the AF ball B2.

The second OIS ball B3 of the present disclosure is disposed at the surface (the second surface) between the AF carrier 130 and the second OIS carrier 140, which is perpendicular to the optical axis and the first surface as described above to linear move (roll) in the second direction (Y-axis direction).

Figure 10:
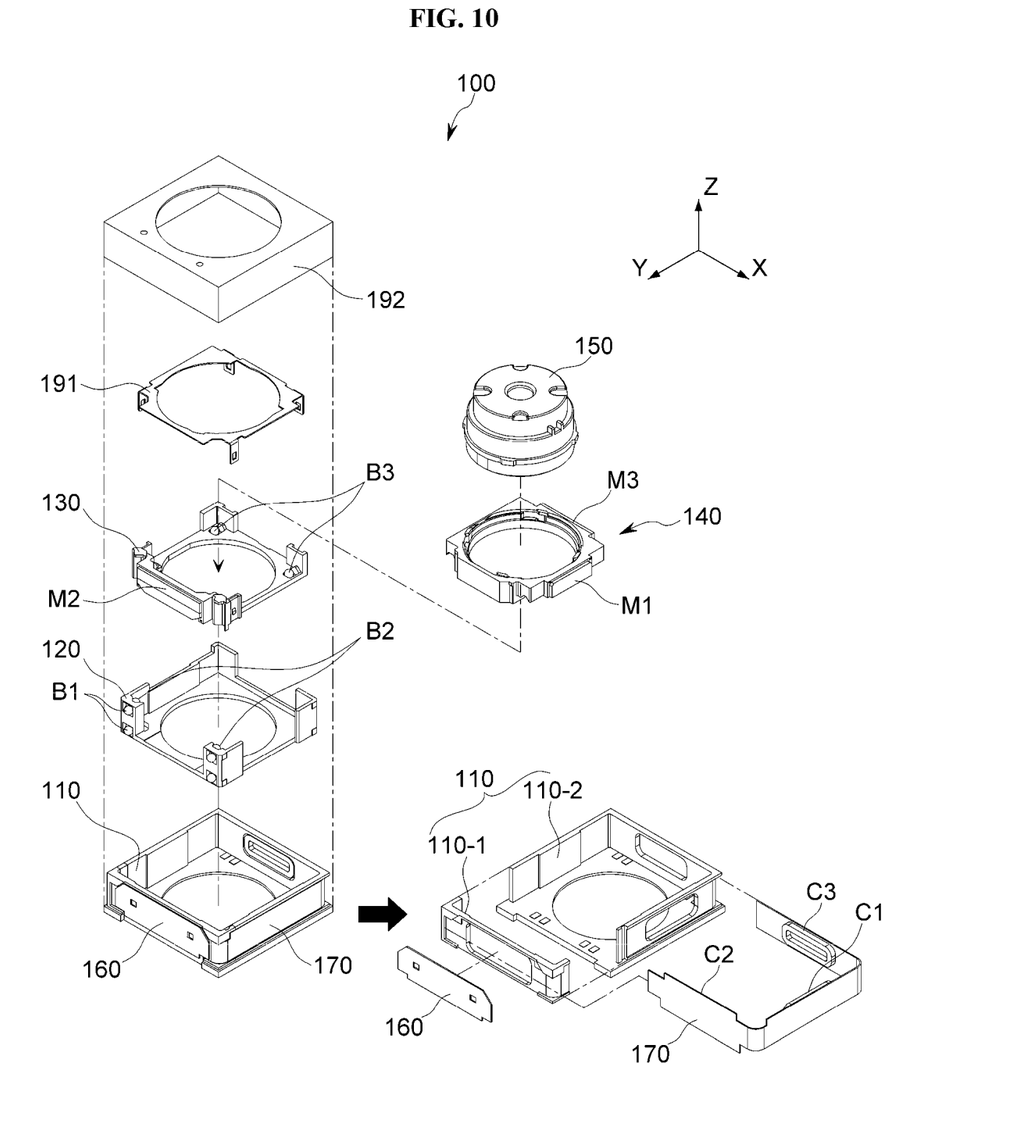
FIGS. 10 and 11 are diagrams for illustrating a first OIS magnet according to another embodiment of the present disclosure.
Figure 11:
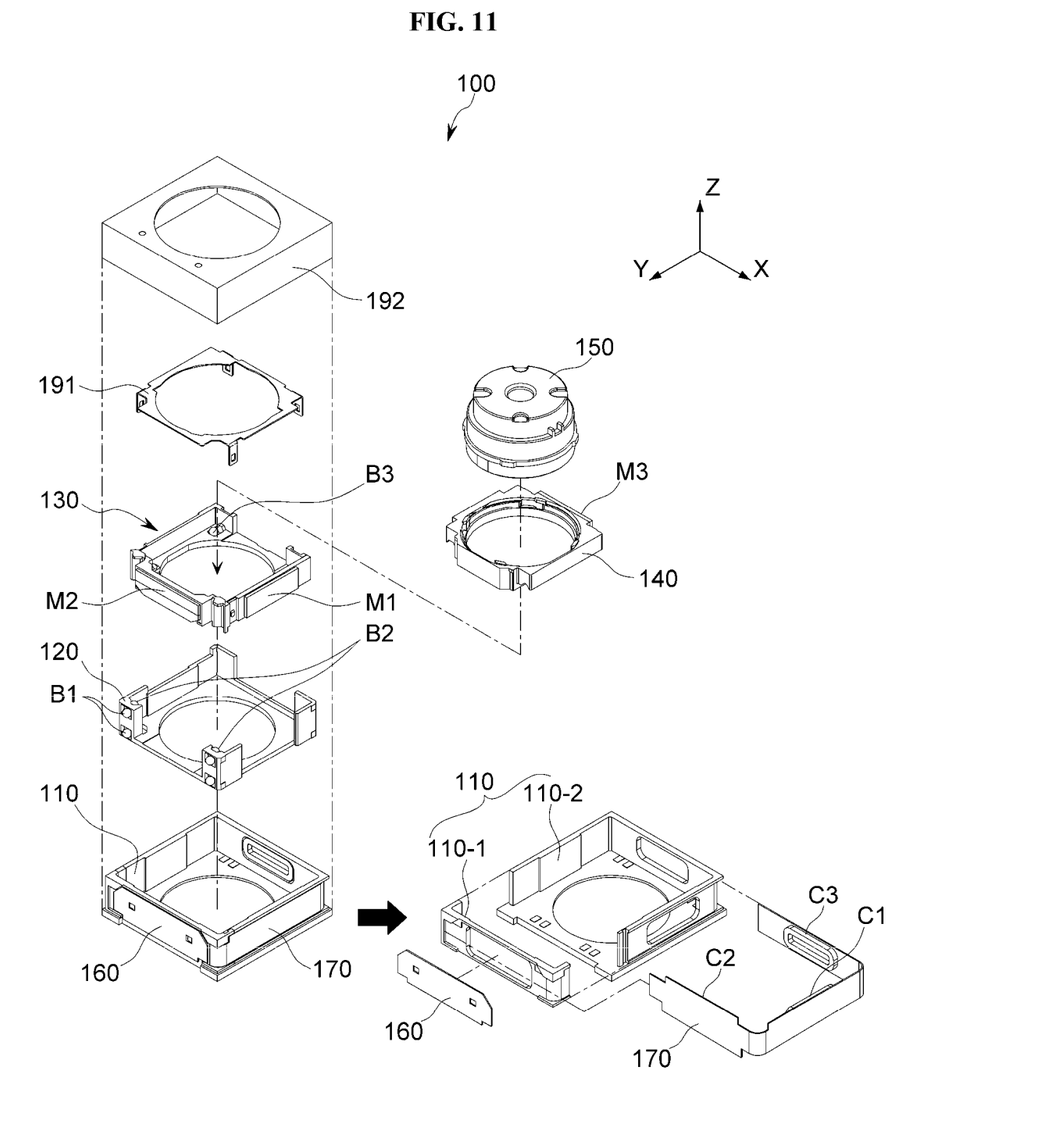

FIGS. 10 and 11 are diagrams for illustrating the first OIS magnet M1 according to another embodiment of the present disclosure. The first OIS magnet M1 may be installed at the first OIS carrier 120 as described above and may also be installed at the second OIS carrier 140 as shown in FIG. 10.

In this case, the first OIS magnet M1 and the second OIS magnet M3 are installed at the second OIS carrier 140, and the magnets M1, M3 are preferably installed in directions perpendicular to each other as shown in the figures so that the magnetic forces in respective directions acting on the respective magnets M1, M3 do not influence each other.

As described above and also shown in the figures, the actuator 100 according to the present disclosure is configured such that the second OIS ball B3 located between the second OIS carrier 140 and the AF carrier 130, the AF ball B2 located between the AF carrier 130 and the first OIS carrier 120 and the first OIS ball B1 located between the first OIS carrier 120 and the base 110 are physically moved or guided perpendicular to each other.

Thus, if the first OIS magnet M1 is installed at the second OIS carrier 140 as described above, the magnetic force generated between the first OIS coil C1 and the first OIS magnet M1 does not influence the individual movement of another carrier (the AF carrier 130, the second OIS carrier 140) (movement in the optical axis direction, movement in the second direction) and only moves the first OIS carrier 120 that is moved and guided in a direction corresponding to the magnetic force generated by the first OIS ball B1.

From a similar point of view, the embodiment shown in FIG. 11 corresponds to an example in which the first OIS magnet M1 is installed at the AF carrier 130.

If the first OIS magnet M1 is installed at the AF carrier 130, even though a magnetic force is generated between the first OIS coil C1 and the first OIS magnet M1, other carriers (the AF carrier 130, the second OIS carrier 140) do not individually move due to the structure where the balls B1, B2, B3 are guided perpendicular to each other, and only the first OIS carrier 120 moves in the first direction.

No individual movement of the other carriers means that the AF carrier 130 does not move in the optical axis direction and the second OIS carrier 140 does not move in the second direction. If the first OIS carrier 120 moves in the first direction, the AF carrier 130 and the second OIS carrier 140 also move in the first direction along with the first OIS carrier 120.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first", "second", "upper" and "lower" are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for a camera, comprising:
    a base having an inner space formed therein;
    a first optical image stabilization (OIS) carrier accommodated in the base to move in a first direction perpendicular to an optical axis direction;
    a first OIS ball located between an inner side of a side surface of the base and an outer side of a side surface of the first OIS carrier;
    an autofocus (AF) carrier mounted on the first OIS carrier and having an autofocus (AF) magnet;
    an AF coil configured to give a driving force to the AF magnet; and
    an AF ball located between the inner side of the side surface of the first OIS carrier and an outer side of a side surface of the AF carrier,
    wherein the AF carrier linearly moves in the optical axis direction relative to the first OIS carrier; and
    wherein the first OIS carrier linearly moves in the first direction along the side surface of the base.

2. The actuator for a camera according to claim 1, further comprising:
    a first OIS magnet provided to the first OIS carrier; and
    a first OIS coil configured to give a driving force to the first OIS magnet.

3. The actuator for a camera according to claim 2, further comprising:
   a first guide line formed at the inner side of the side surface of the base to extend in the first direction; and
   a first groove line formed at the outer side of the side surface of the first OIS carrier to extend in the first direction,
   wherein the first OIS ball is located between the first guide line and the first groove line.

4. The actuator for a camera according to claim 1, further comprising:
   a second guide line formed at the inner side of the side surface of the first OIS carrier to extend in the optical axis direction; and
   a second groove line formed at the outer side of the side surface of the AF carrier to extend in the optical axis direction,
   wherein the AF ball is located between the second guide line and the second groove line.

5. The actuator for a camera according to claim 1, further comprising:
   a second OIS carrier mounted on the AF carrier and having a second OIS magnet;
   a second OIS coil configured to give a driving force to the second OIS magnet; and
   a second OIS ball located between a bottom surface of the AF carrier and a lower surface of the second OIS carrier,
   wherein the second OIS carrier linearly moves in a second direction perpendicular to both the optical axis direction and the first direction relative to the AF carrier.

6. The actuator for a camera according to claim 5, further comprising:
   a first OIS magnet provided to a surface of the second OIS carrier, which is perpendicular to the second OIS magnet, or to the first OIS carrier; and
   a first OIS coil configured to give a driving force to the first OIS magnet.

7. The actuator for a camera according to claim 5, further comprising:
   a third guide line formed at the bottom surface of the AF carrier to extend in the second direction; and
   a third groove line formed at the lower surface of the second OIS carrier to extend in the second direction,
   wherein the second OIS ball is located between the third guide line and the third groove line.

8. The actuator for a camera according to claim 1, wherein the AF ball is in contact with an inner side of a support surface that is a side surface of the first OIS carrier in contact with the first OIS ball at an outer side thereof.

9. The actuator for a camera according to claim 8, wherein the support surface has an opening formed at a center portion thereof so that the AF magnet included in the AF carrier is exposed to the outside.

10. The actuator for a camera according to claim 9, wherein the base includes a main yoke made of a metal material to generate an attractive force to the AF magnet; and
    an adhering force between the AF carrier and the first OIS carrier between which the AF ball is interposed and an adhering force between the first OIS carrier and the base between which the first OIS ball is interposed are simultaneously implemented due to the attractive force between the AF magnet and the main yoke.

11. The actuator for a camera according to claim 1, further comprising:
    a first OIS magnet provided to the AF carrier in a direction perpendicular to the AF magnet; and
    a first OIS coil configured to give a driving force to the first OIS magnet.

12. A camera module, comprising the actuator for a camera according to claim 1.

* * * * *